United States Patent
Groen et al.

(10) Patent No.: US 10,166,833 B2
(45) Date of Patent: Jan. 1, 2019

(54) ACTIVELY ADJUSTABLE WHEEL SUSPENSION FOR THE WHEELS OF AN AXLE OF A MOTOR VEHICLE

(71) Applicant: AUDI AG, Ingolstadt (DE)

(72) Inventors: Matthias Groen, Ingolstadt (DE); Joachim Schmitt, Ingolstadt (DE); Peter Leibl, Manching (DE)

(73) Assignee: Audi AG, Ingolstadt (DE)

( * ) Notice: Subject to any disclaimer, the term of this patent is extended or adjusted under 35 U.S.C. 154(b) by 226 days.

(21) Appl. No.: 15/102,813

(22) PCT Filed: Dec. 4, 2014

(86) PCT No.: PCT/EP2014/003246
§ 371 (c)(1),
(2) Date: Jun. 8, 2016

(87) PCT Pub. No.: WO2015/086133
PCT Pub. Date: Jun. 18, 2015

(65) Prior Publication Data
US 2016/0311287 A1    Oct. 27, 2016

(30) Foreign Application Priority Data
Dec. 9, 2013   (DE) .................. 10 2013 020 563

(51) Int. Cl.
*B60G 11/20*   (2006.01)
*B62D 21/11*   (2006.01)
(Continued)

(52) U.S. Cl.
CPC .......... *B60G 17/025* (2013.01); *B60G 11/181* (2013.01); *B60G 11/20* (2013.01);
(Continued)

(58) Field of Classification Search
CPC .... B60G 17/025; B60G 11/181; B60G 11/20; B60G 2202/132; B60G 2202/32;
(Continued)

(56) References Cited

U.S. PATENT DOCUMENTS 2,788,982 A    4/1957  Allison
4,327,927 A *  5/1982  Tanaka .................. B60G 3/20
                                                280/124.134
(Continued)

FOREIGN PATENT DOCUMENTS

CN          1723136        1/2006
DE   10 2006 061 984 B3   2/2008
(Continued)

OTHER PUBLICATIONS

Chinese Search Report dated Mar. 22, 2017 with respect to counterpart Chinese patent application 201480065686.0.
(Continued)

*Primary Examiner* — Barry Gooden, Jr.
(74) *Attorney, Agent, or Firm* — Henry M. Feiereisen LLC (57) ABSTRACT

An actively adjustable wheel suspension for the wheels of an axle of a motor vehicle, wherein each wheel is articulated on the body side of the motor vehicle via a plurality of wheel control elements, includes for each wheel on the axle a rotary actuator which is supported on the body side and includes a torsion bar. The two rotary actuators can be activated for active adjustment via a control unit, with the rotary actuators and the torsion bars of the rotary actuators being oriented in motor vehicle longitudinal direction. The rotary actuators include each at least one strut, which is oriented in motor vehicle transverse direction, for torque support.

10 Claims, 8 Drawing Sheets

(51) Int. Cl.
*B60G 17/00* (2006.01)
*B60G 17/02* (2006.01)
*B60G 11/18* (2006.01)

(52) U.S. Cl.
CPC ........ *B62D 21/11* (2013.01); *B60G 2202/132* (2013.01); *B60G 2202/32* (2013.01); *B60G 2202/42* (2013.01); *B60G 2204/11* (2013.01); *B60G 2204/122* (2013.01); *B60G 2204/15* (2013.01); *B60G 2204/20* (2013.01); *B60G 2204/422* (2013.01); *B60G 2206/60* (2013.01); *B60G 2206/604* (2013.01)

(58) Field of Classification Search
CPC ............ B60G 2202/42; B60G 2204/11; B60G 2204/122; B60G 2204/15; B60G 2204/20; B60G 2204/422; B60G 2206/60; B60G 2206/604; B62D 21/11
See application file for complete search history.

(56) References Cited

U.S. PATENT DOCUMENTS

| | | | |
|---|---|---|---|
| 4,641,856 A | 2/1987 | Reichenbach | |
| 5,263,736 A * | 11/1993 | Stevens | B60G 3/14 267/273 |
| 5,687,960 A * | 11/1997 | Moon | B60G 11/181 267/154 |
| 6,099,006 A * | 8/2000 | Sugiyama | B60G 11/20 280/124.149 |
| 8,851,493 B2 * | 10/2014 | Michel | B60G 17/025 280/124.137 |
| 8,915,326 B2 | 12/2014 | Leibl | |
| 9,027,945 B2 | 5/2015 | Leibl | |
| 9,108,482 B2 * | 8/2015 | Mohrlock | B60G 17/025 |
| 9,108,676 B2 | 8/2015 | Leibl | |
| 9,139,227 B2 | 9/2015 | Leibl | |
| 9,205,874 B2 | 12/2015 | Schindler et al. | |
| 9,238,391 B1 * | 1/2016 | Luttinen | B60G 7/006 |
| 9,238,394 B2 * | 1/2016 | Leibl | B60G 3/20 |
| 9,321,323 B2 | 4/2016 | Schindler et al. | |
| 9,393,848 B2 * | 7/2016 | Mohrlock | B60G 11/48 |
| 9,415,655 B2 * | 8/2016 | Willems | B60G 11/18 |
| 9,446,653 B2 * | 9/2016 | Schindler | B60G 21/0556 |
| 9,539,873 B2 * | 1/2017 | Willems | F16F 15/035 |
| 9,540,046 B2 * | 1/2017 | Kramer | B60G 21/0555 |
| 9,643,653 B2 * | 5/2017 | Groen | B62D 21/11 |
| 9,694,645 B2 * | 7/2017 | Schmitt | B60G 11/60 |
| 9,873,411 B2 * | 1/2018 | Deutloff | B60T 7/085 |
| 2004/0021285 A1 * | 2/2004 | Frasch | B60G 21/0551 280/124.109 |
| 2005/0098964 A1 * | 5/2005 | Brown | B60G 3/06 280/5.5 |
| 2011/0278811 A1 * | 11/2011 | Ohletz | B60G 11/183 280/124.106 |
| 2012/0261893 A1 * | 10/2012 | Meitinger | B60G 3/20 280/124.13 |
| 2013/0127131 A1 * | 5/2013 | Michel | B60G 11/183 280/124.106 |
| 2013/0147236 A1 * | 6/2013 | Lee | B62D 21/11 296/203.02 |
| 2014/0046502 A1 | 2/2014 | Schmitt | |
| 2015/0014955 A1 * | 1/2015 | Leibl | B60G 3/20 280/124.107 |
| 2015/0191071 A1 * | 7/2015 | Schindler | B60G 21/0556 280/5.511 |
| 2016/0001620 A1 * | 1/2016 | Mohrlock | B60G 11/48 280/124.165 |
| 2016/0311287 A1 * | 10/2016 | Groen | B60G 11/181 |
| 2017/0001666 A1 * | 1/2017 | Lavilluniere | B60G 7/02 |
| 2017/0120713 A1 * | 5/2017 | Drozdowski | B60G 3/06 |

FOREIGN PATENT DOCUMENTS

| | | |
|---|---|---|
| DE | 10 2009 051 469 A1 | 5/2011 |
| DE | 10 2009 052 877 A1 | 5/2011 |
| DE | 10 2011 018 574 A1 | 10/2012 |
| DE | 10 2011 105 547 A1 | 12/2012 |
| JP | S64-70213 | 3/1989 |
| JP | 2008-302731 | 12/2008 |
| WO | WO 97/46417 | 12/1997 |
| WO | WO 00/38939 | 7/2000 |
| WO | 2010/083876 A1 | 7/2010 |
| WO | WO 2014/124721 A1 | 8/2014 |

OTHER PUBLICATIONS

Translation of Chinese Search Report dated Mar. 22, 2017 with respect to counterpart Chinese patent application 201480065686.0.
International Search Report issued by the European Patent Office in International Application PCT/EP2014/003246.

* cited by examiner

Fig. 7

ACTIVELY ADJUSTABLE WHEEL SUSPENSION FOR THE WHEELS OF AN AXLE OF A MOTOR VEHICLE

CROSS-REFERENCES TO RELATED APPLICATIONS

This application is the U.S. National Stage of International Application No. PCT/EP2014/003246, filed Dec. 4, 2014, which designated the United States and has been published as International Publication No. WO 2015/086133 and which claims the priority of German Patent Application, Serial No. 10 2013 020 563.8, filed Dec. 9, 2013, pursuant to 35 U.S.C. 119(a)-(d).

BACKGROUND OF THE INVENTION

The invention relates to an actively adjustable wheel suspension for the wheels of an axle of a motor vehicle.

So-called active systems for calming the body of a motor vehicle are well known. Rotary actuators are normally used for this purpose to rotate a torsion bar. By applying a torque upon the torsion bar, active forces are produced, which can affect the wheel movement or the body motion of the motor vehicle.

A generic actively adjustable wheel suspension for the rear wheels of an axle of a motor vehicle is disclosed in EP 2 389 299. Each wheel of the axle is hereby supported on a subframe via several wheel control elements and is operatively connected via its wheel control elements with an adjustable torsion bar. Associated to each of the torsion bars, oriented in motor vehicle transverse direction, is a rotary actuator—also oriented in motor vehicle transverse direction—, via which the torque can be applied upon the torsion bars, i.e. provision of active forces to counteract e.g. a rolling motion. The two rotary actuators, oriented in motor vehicle transverse direction, are accommodated in a common housing, which is supported with a mounting upon a cross member of the subframe. Since the arrangement of the torsion bars, rotary actuators and the housing requires relatively much installation space, package space in vehicle longitudinal direction and vehicle transverse direction is not utilized in an optimum manner The invention is based on the object to provide an actively adjustable wheel suspension for the wheels of a motor vehicle, such that a space-saving arrangement for the components necessary for the active wheel suspension is ensured.

This object is achieved by an actively adjustable wheel suspension for the wheels of an axle of a motor vehicle, wherein each wheel is articulated on the body side via a plurality of wheel control elements, and each wheel is operatively connected with a rotary actuator which is supported on the body side and includes a torsion bar, and wherein the two rotary actuators can be activated for active adjustment via a control unit, wherein the rotary actuators and the torsion bars of the rotary actuators are oriented in motor vehicle longitudinal direction, and wherein the rotary actuators include each at least one strut, oriented in motor vehicle transverse direction, for torque support.

The subclaims set forth advantageous refinements of the invention.

SUMMARY OF THE INVENTION in known manner, each wheel of the actively adjustable wheel suspension is articulated via several wheel control elements on the body side, and each wheel of the axle is operatively connected with a rotary actuator which is supported on the body side and includes a torsion bar. Furthermore, provision is made for a control unit, by which the two rotary actuators can be actively activated, i.e. adjusted.

According to the invention, the rotary actuators supported on the body side as well as the torsion bars of the rotary actuators are oriented in motor vehicle longitudinal direction. To provide torque support, the rotary actuators have each at least one strut oriented in motor vehicle transverse direction and secured on the body side by fastening means.

Since in accordance with the invention, only the struts are now oriented in motor vehicle transverse direction for torque support, the active wheel suspension according to the invention is characterized by a particularly space-saving arrangement.

A further advantage is that motor vehicles with a conventional torsion bar stabilizer can be equipped or retrofitted rapidly and cost-effectively in a simple manner with an active chassis because as a result of the arrangement and design of the rotary actuators and torsion bars in accordance with the invention and absence of the conventional torsion bar stabilizer, installation space is freed up which is sufficient for the arrangement of these components.

Preferably, the body-side articulation of the wheel control elements or the body-side mounting/securement of the rotary actuators/struts of the rotary actuators is realized upon a subframe. The subframe has, for this purpose, two longitudinal members oriented in vehicle longitudinal direction, a rear cross member oriented in vehicle transverse direction, and a front cross member oriented in vehicle transverse direction. The front cross member is hereby configured with an open cross-section, by which a stabilizer lane, oriented in motor vehicle transverse direction, is formed. In addition, the control unit is hereby arranged in the stabilizer lane and secured to the front cross member by fastening means. This arrangement has proven advantageous because positioning of the control unit in the stabilizer lane ensures a space-saving arrangement that is protected from external influences.

According to another embodiment of the invention, the strut of a rotary actuator is configured in the shape of a housing, and the control unit is integrated in the housing-shaped strut. This embodiment is characterized by its small number of components and accompanied by a faster and more cost-effective installation.

As an alternative, the strut of a rotary actuator has a fastening portion to which the control unit can be attached. This embodiment has the advantage that a simple installation is ensured.

Preferably, a subframe is again provided for the body-side mounting and includes two longitudinal members oriented in vehicle longitudinal direction, a rear cross member oriented in vehicle transverse direction, and a cross member oriented in vehicle transverse direction. Furthermore, the front cross member has again an open cross section to form a stabilizer lane in motor vehicle transverse direction. The housing-shaped strut of the one rotary actuator and the control unit integrated in the housing-shaped strut, or the strut, having the fastening portion, of the one rotary actuator, and the control unit attached to the fastening portion as well as the strut of the other rotary actuator, are arranged in the stabilizer lane and secured to the front cross member. The positioning of the components housing-shaped strut with integrated control unit and the strut of the other rotary actuator in the stabilizer lane again ensures a protected and space-saving arrangement.

According to a further embodiment of the invention, the two struts are formed as a single-part housing structure, in which the control unit is integrated.

The advantage of this embodiment is that a uniform module is made available that can be mounted quickly instead of a conventional stabilizer.

Preferably hereby is that the single-part housing structure and the rotary actuators are formed as a single-part structural unit. Alternatively, the single-part housing structure and the rotary actuators are constructed in several parts, with the rotary actuators being secured by fastening means on the single-part housing structure.

Advantageously, the fastening means can hereby lie in a plane of symmetry of the rotary actuator or perpendicular thereto. Thus, it is possible to use the left-hand rotary actuator as identical part on the right-hand side, and vice versa.

Preferably, a subframe is again provided for the body-side installation and includes two longitudinal members oriented in vehicle longitudinal direction, a rear cross member oriented in vehicle transverse direction, and a front cross member oriented in vehicle transverse direction. In addition, the front cross member again is formed with an open cross section to form a stabilizer lane oriented in motor vehicle transverse direction. The housing structure accommodating hereby the control unit and the two rotary actuators is disposed in the stabilizer lane and secured to the front cross member. This ensures in an advantageous manner that acting forces and torques are absorbed by the common housing structure, i.e. there is no longer a direct introduction into the subframe. This has the positive effect that slighter forces and torques are transmitted via the fastening points housing structure—subframe, with the result that the subframe can be dimensioned more lightweight.

According to an alternative arrangement, the uniform module, comprised of the single-part housing structure, the rotary actuators supported in the housing structure, and the control unit integrated in the housing structure, is again disposed on a subframe. The subframe includes hereby two longitudinal members oriented in vehicle longitudinal direction and a rear cross member oriented in vehicle transverse direction. The common housing structure is secured, preferably in the form of a transverse strut, to both longitudinal members. The housing structure is hereby dimensioned such that the subframe can be formed in the absence of the front cross member. The arrangement, design, and dimensioning ensures in an advantageous manner that the housing structure additionally assumes the function of a subframe cross member. This ensures a particularly weight-reduced design of the subframe.

BRIEF DESCRIPTION OF THE DRAWING

Further advantages and applications of the present invention will become apparent from the following description in conjunction with the embodiments illustrated in the drawings.

In the description, in the claims, and in the drawing, the terms used in the below list of reference signs and associated reference signs are used.

In the drawing, it is shown in.

DETAILED DESCRIPTION OF PREFERRED EMBODIMENTS

To avoid repetitions, the following description and the figures identify same structures and components by same reference numerals, so long as no further differentiation is necessary or useful.

Figure 1:
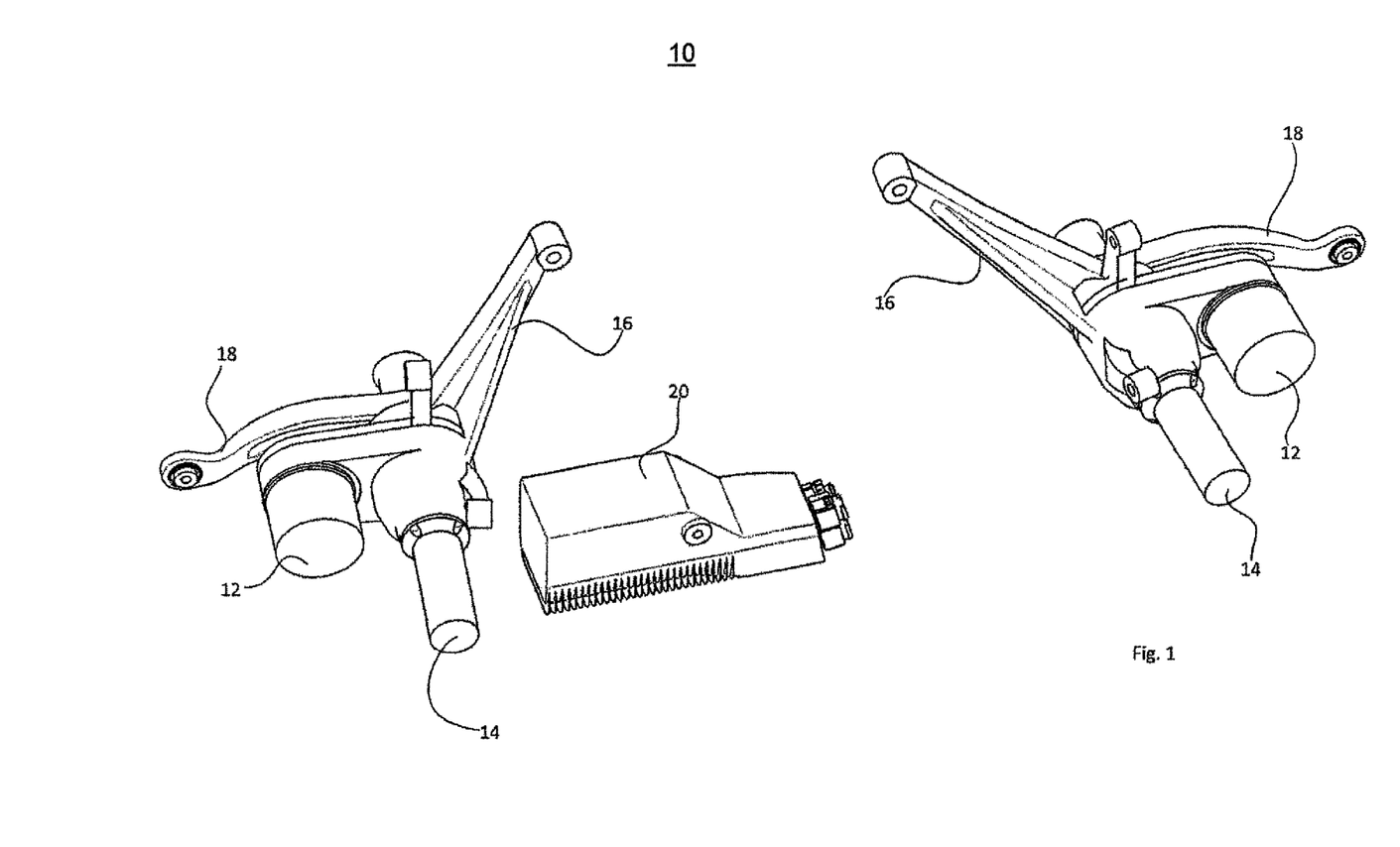
FIG. 1 a first embodiment of the components rotary actuators, torsion bars and control unit necessary for an active wheel suspension FIG. 2 the components of FIG. 1 in the assembled state on a subframe.

FIG. 1 shows by way of a first embodiment, the components to be associated to a wheel of an axle for realization of an active wheel suspension—subsequently designated in its entirety by reference numeral 10.

A rotary actuator 12 with torsion bar 14 is associated to each wheel. The unit of rotary actuator 12 with torsion bar 14 further includes at least one strut 16 for torque support and a lever element 18. The torsion bars 14 respectively interact with the wheel via the lever element 18 so that the rolling motion, body motion, curve slope, pitching motion of the motor vehicle can be influenced through appropriate adjustment of the torsion bars 14. Further illustrated is a control unit 20 via which the rotary actuators 12 can be activated in a targeted manner.

Figure 2:
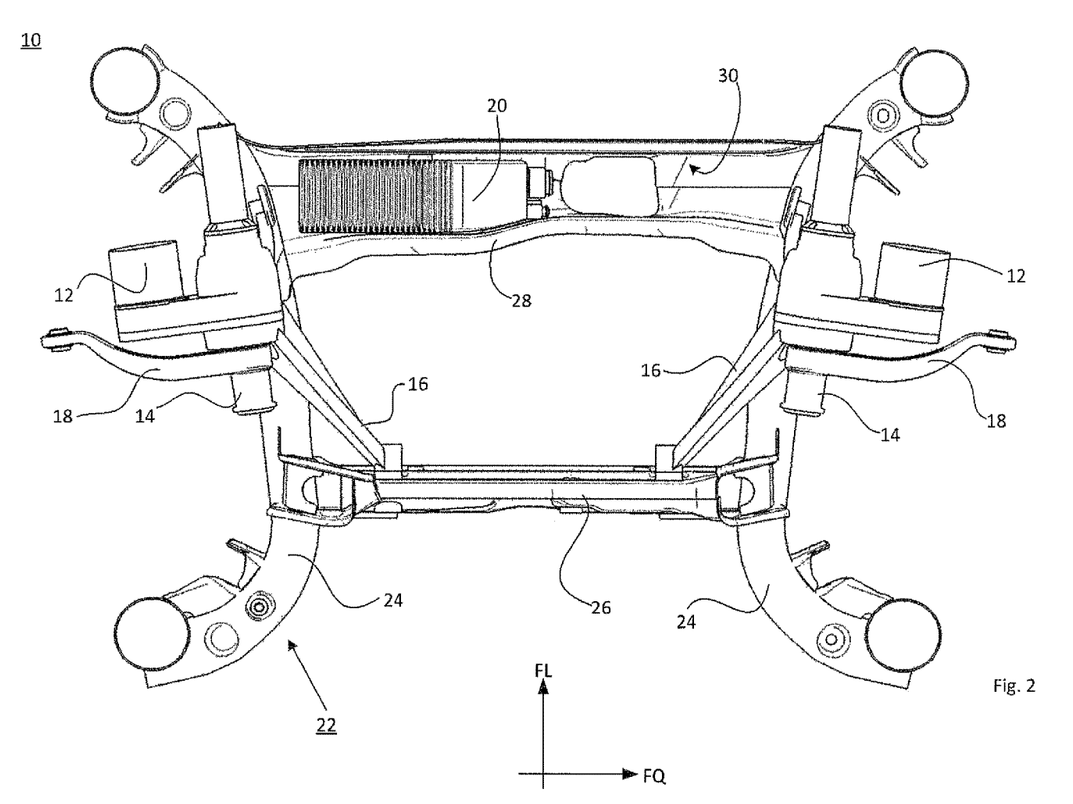

FIG. 2 shows by way of a bottom view a subframe, generally designated by reference numeral 22 for attachment of the components of FIG. 1. For reasons of clarity, illustration of wheel control elements and wheels has been omitted.

The subframe 22 has two longitudinal members 24 oriented in vehicle longitudinal direction FL, and a rear cross member 26 oriented in vehicle transverse direction FQ as well as a front cross member 28 oriented in vehicle transverse direction FQ.

As is clearly apparent from FIG. 2, the front cross member 28 has hereby an open profile in cross section, so that a stabilizer lane 30 is formed in motor vehicle transverse direction FQ. A conventional wheel suspension has arranged therein a conventional torsion bar stabilizer in such a stabilizer lane 30.

As is further apparent from FIG. 2, the two rotary actuators 12 and the torsion bars 14 of the rotary actuators 12 are formed in motor vehicle longitudinal direction FL. The control unit 20, via which the two rotary actuators 12 are activated, is disposed in the stabilizer lane 30 in a space-saving manner. A torque support of the rotary actuators 12 is ensured via the strut 16, essentially oriented in vehicle transverse direction FQ and respectively articulated to the rear cross member 26.

Figure 3:
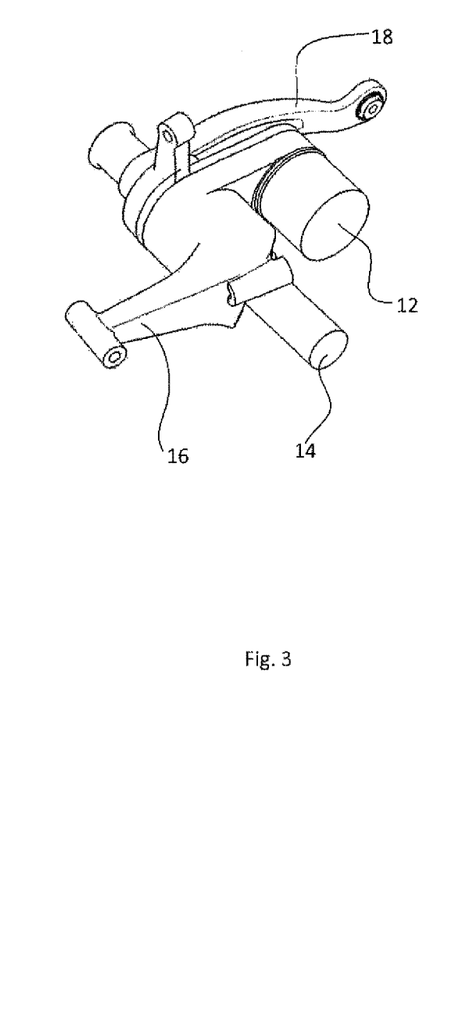
FIG. 3 the components for an active suspension system according to another embodiment.

FIG. 3 shows a further configuration of the components rotary actuators 12, torsion bars 14, and control unit 20, necessary for the active wheel suspension. While the unit, shown on the right-hand side and comprised of rotary actuator 12, torsion bar 14, lever element 18 and strut 16, corresponds essentially to the arrangement described above with reference to FIG. 1, the control unit 20 is integrated—as can be seen in FIG. 3—in the strut 16' with respect to the other opposite rotary actuators 12. To this end, the strut 16' is formed in the shape of a housing so as to provide respective installation space for integration of the control unit 20.

Figure 4:
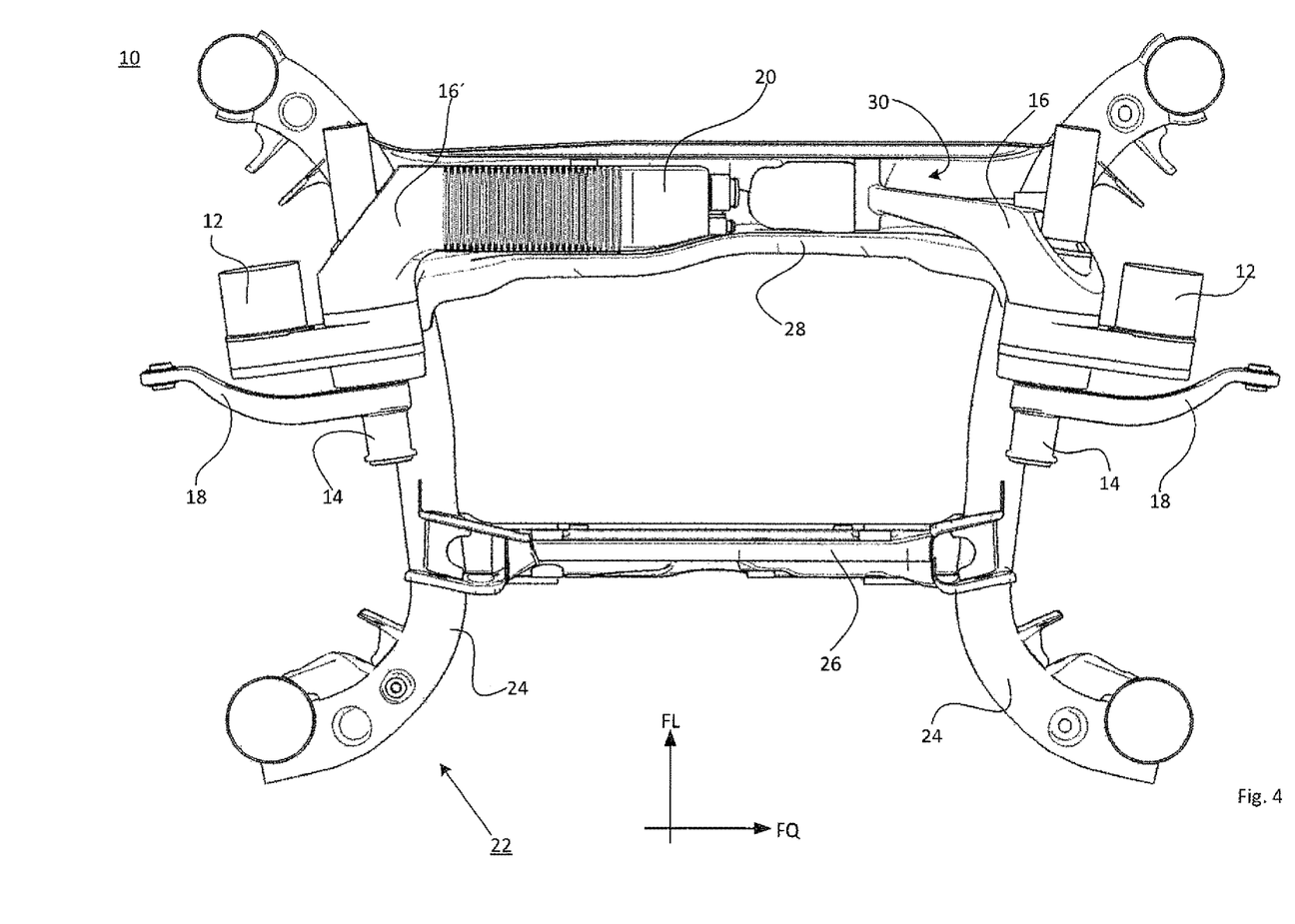
FIG. 4 the components of FIG. 3 in the assembled state on a subframe.

FIG. 4 shows the components of FIG. 3 in the assembled state upon a subframe 22. The subframe 22 corresponds hereby to the one illustrated in FIG. 2, in particular, the front cross member 28 again includes a stabilizer lane 30. In the assembled state, the housing-shaped strut 16' with integrated control unit 20 of the one rotary actuator 12 and the strut 16 of the other rotary actuator 12 are arranged in the stabilizer lane 30.

Figure 5:
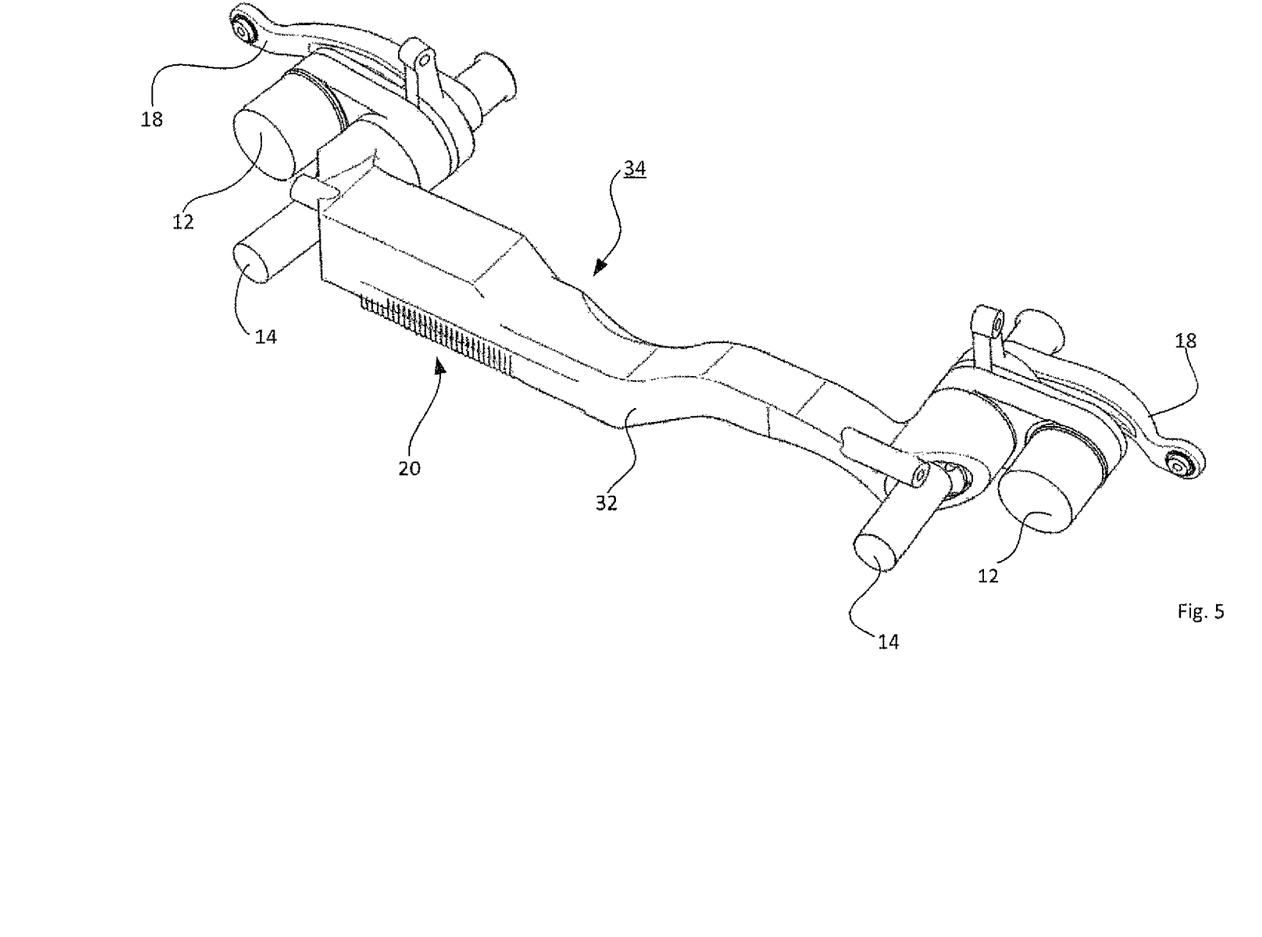
FIG. 5 the components for an active suspension system according to another embodiment.

In the configuration of the components of rotary actuators 12, torsion bars 14, and control unit 20, as shown in FIG. 5, the two struts 16 form a single-part housing structure 32 oriented in motor vehicle transverse direction. In addition to the support of the rotary actuators 12, the control unit is also integrated in this housing structure 32, so that single-part housing structure 32 and the rotary actuators 12 form a single-part structural unit 34.

Figure 6:
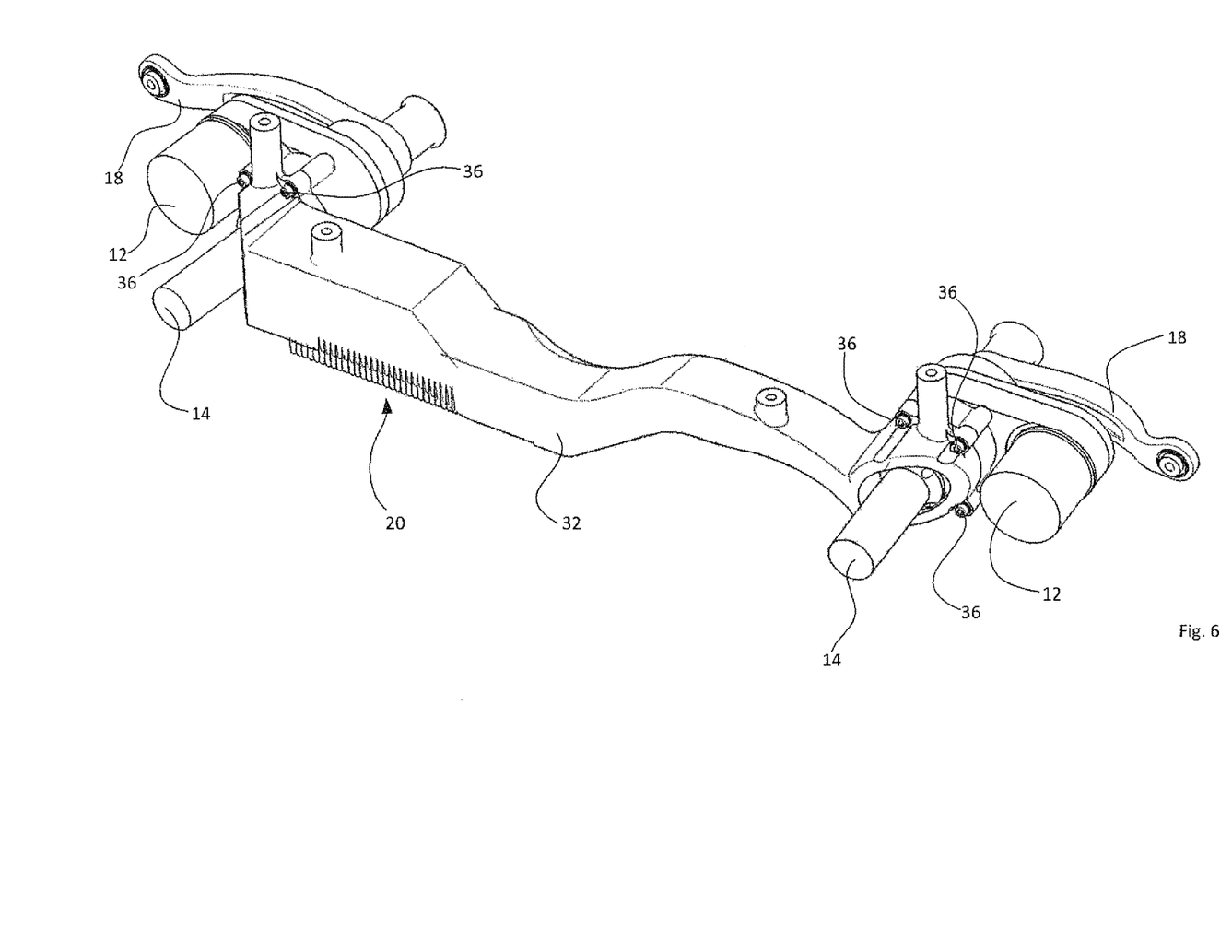
FIG. 6 an alternative embodiment of the components shown in FIG. 5.

According to FIG. 6, the two struts form again a single-part structural unit 32 in which the control unit 32 is integrated. In contrast to FIG. 5, the rotary actuators 12 are not directly supported in the housing structure 32, i.e. rotary actuators 12 and housing structure 32 do not form a single-part structural unit, rather the housings of the rotary actuators 12 are secured by fastening means 36 upon the housing structure 32. As FIG. 6 further shows, the fastening means 36 are hereby oriented in direction of the torsion bars 14 of the rotary actuators 12.

Figure 7:
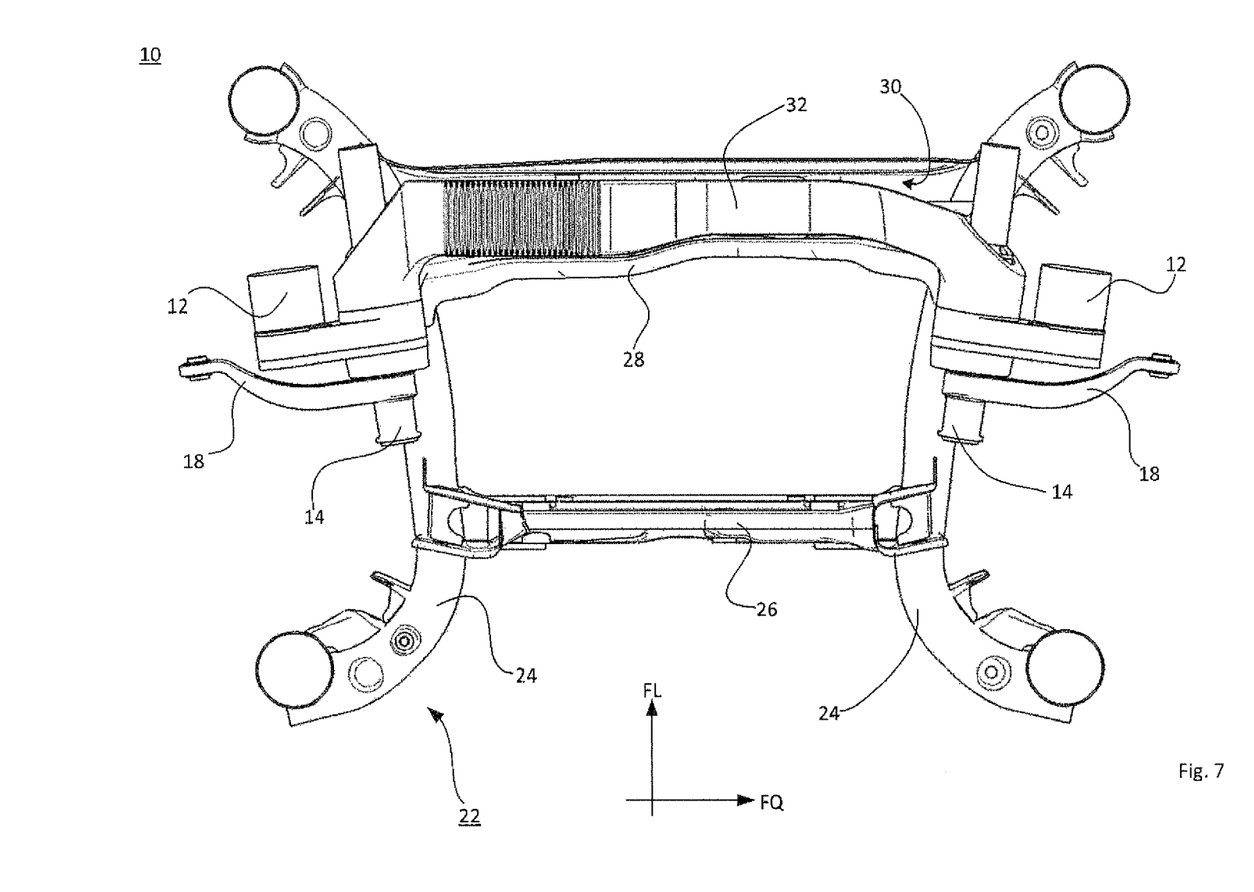
FIG. 7 the components of FIG. 5 in the assembled state on a subframe, and FIG. 8 the components of FIG. 5 in the assembled state on a differently configured subframe.

FIG. 7 shows the components of FIG. 5 in the assembled state upon a subframe 22 which corresponds to the afore-described subframe. I.e. the subframe 22 has again two longitudinal members 24 oriented in vehicle longitudinal direction FL and two cross members 28 oriented in vehicle transverse direction FQ, with the front cross member 28 having an open cross section, so that a stabilizer lane 30 is formed in motor vehicle transverse direction FQ. The rotary actuators 12, torsion bars 14, which are oriented in motor vehicle longitudinal direction FL, and the control unit 20, which is oriented in motor vehicle transverse direction 32, are secured on the subframe 22. The housing structure 32 is hereby dimensioned such as to be positionable and securable in the open cross section of the front cross member 28, i.e. in the stabilizer lane 30.

Figure 8:
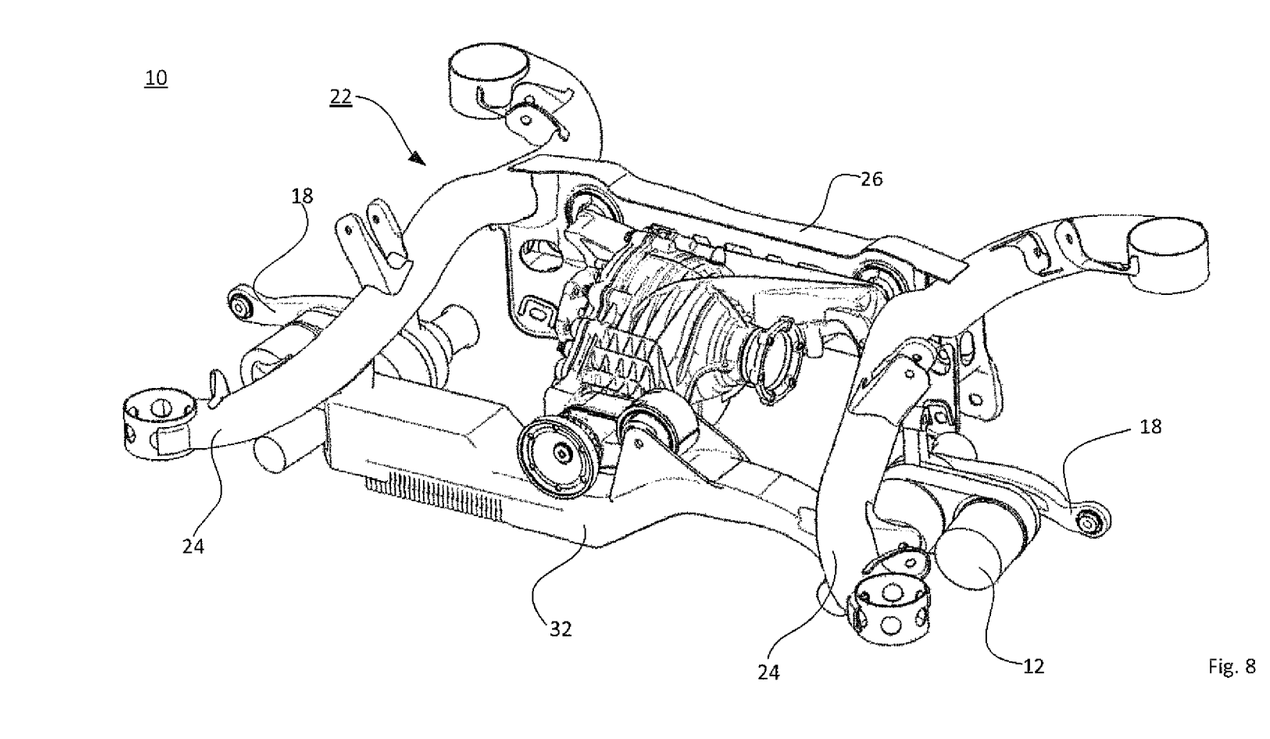

In contrast thereto, the embodiment of the subframe 32, as illustrated in FIG. 8, is configured in the absence of a front cross member. For this purpose, the housing structure 32, oriented in motor vehicle transverse direction FQ and secured to the longitudinal members 24, is configured and dimensioned such that the housing structure 32 is able to absorb acting forces and torques. This ensures that the housing structure 32 assumes the function of the front cross member. I.e. the subframe 22 may—as shown in FIG. 7—be formed without front cross member.

What is claimed is:

1. An actively adjustable wheel suspension for a wheel of an axle of a motor vehicle, comprising
   a first rotary actuator operatively connected to the wheel and supported on a body of the motor vehicle, said first rotary actuator including a torsion bar and at least one strut which is provided for torque support, with the first rotary actuator and the torsion bar being oriented in a vehicle longitudinal direction, and with the at least one strut being oriented in a vehicle transverse direction; and
   a control unit configured to activate the first rotary actuator for active adjustment,
   wherein the at least one strut of the first rotary actuator is designed in the shape of a housing, with the control unit being integrated in the at least one strut.

2. The actively adjustable wheel suspension of claim 1, further comprising a subframe including two longitudinal members oriented in the vehicle longitudinal direction, a rear cross member oriented in the vehicle transverse direction, and a front cross member oriented in the vehicle transverse direction, said front cross member having an open cross section to form a stabilizer lane oriented in the vehicle transverse direction, with the control unit being arranged in the stabilizer lane.

3. The actively adjustable wheel suspension of claim 1, further comprising a second rotary actuator operatively connected to another wheel of the axle of the motor vehicle, and a subframe including two longitudinal members oriented in the vehicle longitudinal direction, a rear cross member oriented in the vehicle transverse direction, and a front cross member oriented in the vehicle transverse direction, said front cross member having an open cross section to form a stabilizer lane oriented in the vehicle transverse direction, said at least one housing-shaped strut, said control unit integrated in the at least one strut, and at least one strut of the second rotary actuator being arranged in the stabilizer lane.

4. An actively adjustable wheel suspension for a wheel of an axle of a motor vehicle, comprising
   a first rotary actuator operatively connected to the wheel and supported on a body of the motor vehicle, said first rotary actuator including a torsion bar and at least one strut which is provided for torque support, with the first rotary actuator and the torsion bar being oriented in a vehicle longitudinal direction, and with the at least one strut being oriented in a vehicle transverse direction;
   a second rotary actuator operatively connected to another wheel of the axle of the motor vehicle, and a subframe including two longitudinal members oriented in the vehicle longitudinal direction, a rear cross member oriented in the vehicle transverse direction, and a front cross member oriented in the vehicle transverse direction, said front cross member having an open cross section to form a stabilizer lane oriented in the vehicle transverse direction, wherein at least one strut of the second rotary actuator is arranged in the stabilizer lane, and
   a control unit configured to activate at least one of the first rotary actuator and the second rotary actuator for active adjustment,
   said control unit affixed on the subframe.

5. An actively adjustable wheel suspension for a wheel of an axle of a motor vehicle, comprising
   a first rotary actuator operatively connected to the wheel and supported on a body of the motor vehicle, said first rotary actuator including a torsion bar and at feast one strut which is provided for torque support, with the first rotary actuator and the torsion bar being oriented in a vehicle longitudinal direction, and with the at least one strut being oriented in a vehicle transverse direction;
   a second rotary actuator operatively connected to another wheel of the axle of the motor vehicle, said at least one strut of the first rotary actuator and at least one strut of the second rotary actuator being configured as a single-part housing structure in which the control unit is integrated; and a control unit configured to activate at least one of the first rotary actuator and the second rotary actuator for active adjustment.

6. The actively adjustable wheel suspension of claim 5, wherein the single-part housing structure, the first rotary actuator and the second rotary actuator form a single-part structural unit.

7. The actively adjustable wheel suspension of claim 5, further comprising a subframe including two longitudinal members oriented in the vehicle longitudinal direction, a rear cross member oriented in the vehicle transverse direction, and a front cross member oriented in the vehicle transverse direction, said front cross member having an open cross section to form a stabilizer lane oriented in the vehicle transverse direction, said housing structure with the integrated control unit being arranged in the stabilizer lane.

8. The actively adjustable wheel suspension of claim 5, further comprising a subframe including two longitudinal members oriented in the vehicle longitudinal direction, and a rear cross member oriented in the vehicle transverse direction, said housing structure with the integrated control unit being secured to the two longitudinal members, with the housing structure being dimensioned such that the subframe can be formed in an absence of another cross member.

9. The actively adjustable wheel suspension of claim 5, wherein the single-part housing structure, the first rotary actuator, and the second rotary actuator are of multipart configuration, further comprising fasteners configured to secure the first rotary actuator and the second rotary actuator to the single-part housing structure.

10. The actively adjustable wheel suspension of claim 9, wherein the fasteners lie in a plane of symmetry of the first and second rotary actuators or extend in perpendicular relation to the first rotary actuator and the second rotary actuator.

\* \* \* \* \*